No. 895,657.  
PATENTED AUG. 11, 1908.  
P. J. MOLL.  
MEAT BROILER.  
APPLICATION FILED JULY 27, 1907.

Inventor,  
Phebe J. Moll.

Witnesses:

By C.A. Snow & Co.  
Attorneys.

UNITED STATES PATENT OFFICE.

PHEBE JOANNA MOLL, OF LOS ANGELES, CALIFORNIA.

MEAT-BROILER.

No. 895,657.  Specification of Letters Patent.  Patented Aug. 11, 1908.

Application filed July 27, 1907. Serial No. 385,823.

*To all whom it may concern:*

Be it known that I, PHEBE JOANNA MOLL, a citizen of the United States, residing at Los Angeles, in the county of Los Angeles and State of California, have invented a new and useful Meat-Broiler, of which the following is a specification.

This invention relates to cooking utensils.

The objects of the invention are in a ready, inexpensive and practical manner and without interfering with the proper operation of cooking, or in any way detracting from the effective application of heat to the article being dressed, either by being roasted, fried or baked, to prevent contact of meats with the bottom of a skillet, frying or roasting pan, and with the grease or fat; to obviate uneven cooking of meats by preventing bulging of the same in spots and to insure the even application of heat to all parts; to secure even broiling of thin meats, such as sliced ham, breakfast bacon and the like, and generally to simplify and improve existing methods of cooking meats of different kinds.

With the above and other objects in view as will appear as the nature of the invention is better understood, the same consists in the novel construction and combination of parts of a cooking utensil as will be hereinafter fully described and claimed.

Figure 1:
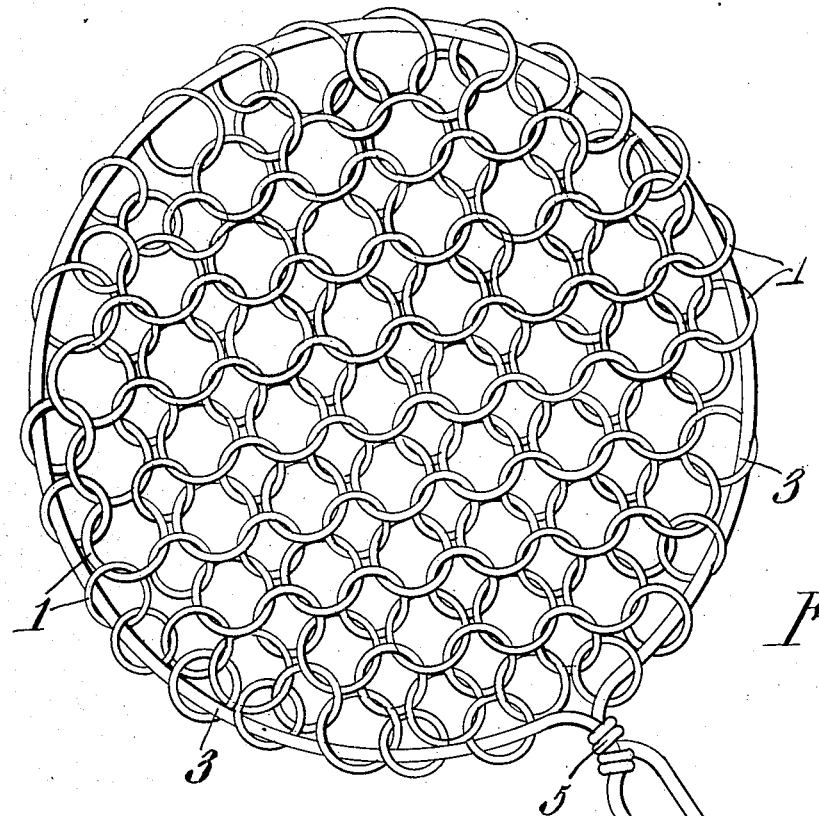
Figure 2:
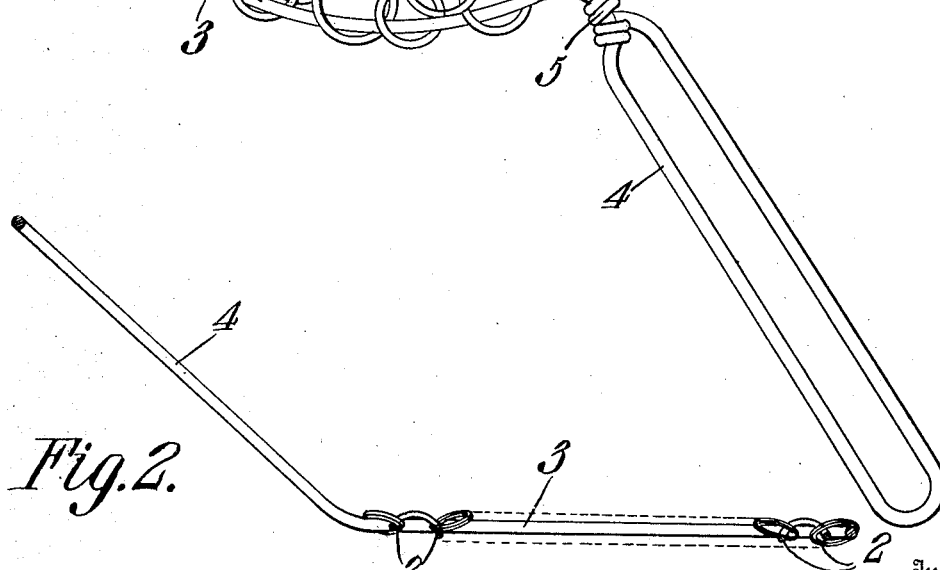

In the accompanying drawings forming a part of this specification and in which like characters of reference indicate corresponding parts,—Figure 1 is a view in plan of a cooking utensil constructed in accordance with the present invention. Fig. 2 is a vertical longitudinal sectional view of the same.

The utensil is composed of a body, a frame and a handle, the two latter parts being preferably integral.

The body is constructed of loosely interlocked rings 1 of any size and of any preferred metal, and which are assembled in over and under order, thus to cause rows of ribs 2 to be formed on each side of the body that will operate to support the article being cooked above and out of contact with the bottom of the pan or skillet containing the utensil, and also keep it practically free from immersion in melted grease. The rings 1 may all be of the same size or of two sizes, as shown.

The frame 3 and handle 4 are, as stated, integral, although this is not absolutely essential, and are constructed from a single piece of wire of any suitable gage that is threaded through the marginal or outer series of rings, and twisted together to form a reinforced neck 5 and then formed into the handle 4 of the design shown, or otherwise. To facilitate the use of the utensil, the handle 4 is disposed at an angle to the frame.

It will be observed, by reference to Fig. 2, that the frame exerts a tension on the body to cause the same to be flat, and thus present a more even surface to the article being cooked than if the body were permitted to sag.

In the use of the device it is simply placed upon the bottom of the skillet or other utensil and the article to be cooked is placed on top of it. Owing to the fact that the meat will be kept out of contact with the bottom of the utensil all danger of bulging or warping will be prevented so that even cooking of the entire surface of the meat will be secured, and that without danger of burning. When used as a broiler for thin meats the utensil is simply placed over the stove hole in the manner of an ordinary broiler.

While the implement is herein shown as circular in shape, it is to be understood that it may be of any other desired contour and made in sizes to fit roasting pans and skillets. Further, in some instances the handle may be omitted, or both the handle and the frame.

What is claimed is:—

The combination with a skillet, of a utensil comprising a body constructed of loosely interlocked rings assembled in over and under order to cause rows of ribs to be formed on each side of the body that will operate to support the article being cooked above and out of contact with the bottom of the skillet, and also to keep such article practically free from immersion in melted grease, a frame threaded through the marginal rings and operating to retain the body under tension, and a handle projecting from the frame.

In testimony that I claim the foregoing as my own, I have hereto affixed my signature in the presence of two witnesses.

PHEBE JOANNA MOLL.

Witnesses:
E. J. QUALLE, Jr.,
ZENA B. WALES.